(12) United States Patent  
Ziegler, Jr.

(10) Patent No.: US 6,731,992 B1  
(45) Date of Patent: May 4, 2004

(54) REMOTELY ACCESSIBLE ENERGY CONTROL SYSTEM

(75) Inventor: Eldon W. Ziegler, Jr., Clarksville, MD (US)

(73) Assignee: Atlantic Software, Inc., Clarksville, MD (US)

( * ) Notice: Subject to any disclaimer, the term of this patent is extended or adjusted under 35 U.S.C. 154(b) by 521 days.

(21) Appl. No.: 09/718,227

(22) Filed: Nov. 22, 2000

(51) Int. Cl.[7] .............................................. G05B 19/18
(52) U.S. Cl. .............................. 700/65; 700/9; 700/19; 700/20; 700/66; 700/17; 700/83; 702/188
(58) Field of Search ........................... 700/9, 3, 65, 66, 700/17, 19, 20, 83; 702/188

(56) References Cited

U.S. PATENT DOCUMENTS

| | | | | |
|---|---|---|---|---|
| 5,805,442 A | * | 9/1998 | Crater et al. ................. | 700/9 |
| 5,845,230 A | * | 12/1998 | Lamberson ................... | 702/56 |
| 5,909,368 A | * | 6/1999 | Nixon et al. .................. | 700/2 |
| 5,923,557 A | * | 7/1999 | Eidson ......................... | 700/129 |
| 5,956,487 A | * | 9/1999 | Venkatraman et al. ....... | 709/218 |
| 5,960,214 A | * | 9/1999 | Sharpe et al. ................. | 700/9 |
| 5,975,737 A | * | 11/1999 | Crater et al. ................. | 700/9 |
| 5,980,090 A | * | 11/1999 | Royal et al. .................. | 700/241 |
| 6,038,486 A | * | 3/2000 | Saitoh et al. ................. | 700/96 |
| 6,092,078 A | * | 7/2000 | Adolfsson .................... | 707/102 |
| 6,176,421 B1 | * | 1/2001 | Royal et al. .................. | 700/241 |

OTHER PUBLICATIONS

ProAtion Energy Control System Sample Office System, no date.
ProAtion 2000 Energy Control System.
2000 ProAtion for Windows 95 and NT—User Manual/Designer Manual Version 4.0, Sep. 1998, Atlantic Software, Inc.
ES–1400e—Enerlogic System 1400e User's Manual, 1987–1991, Enerlogic Systems, Inc., Table of Contents w/pages 3–2,3–3, and B–6 through B–9.

* cited by examiner

Primary Examiner—Ramesh Patel
(74) Attorney, Agent, or Firm—Crowell & Moring LLP

(57) ABSTRACT

An advanced remotely accessible energy control system utilizes a client/server software architecture, and an "open" communication protocol, such as the well known TCP/IP protocol for design-in remote accessibility. Multiple graphic user interface clients can operate on widely available computers incorporating operating systems which are well suited to graphic user interface functions, while the energy control server and the input/output interface components can operate on a separate computer, using other or different operating systems, which are adapted to the processing performed there. According to the invention, the graphic user interface software is resident on one or more graphic user interface consoles or clients, so that processing for formatting data for display, and processing of input actions taken by a system user are offloaded from the server to the graphic user interface clients. Data describing the format of the display is stored on the server, so a user can move the graphic user interface software to another computer, connect to the server and view the system information, without transporting files describing the format of the display.

35 Claims, 18 Drawing Sheets

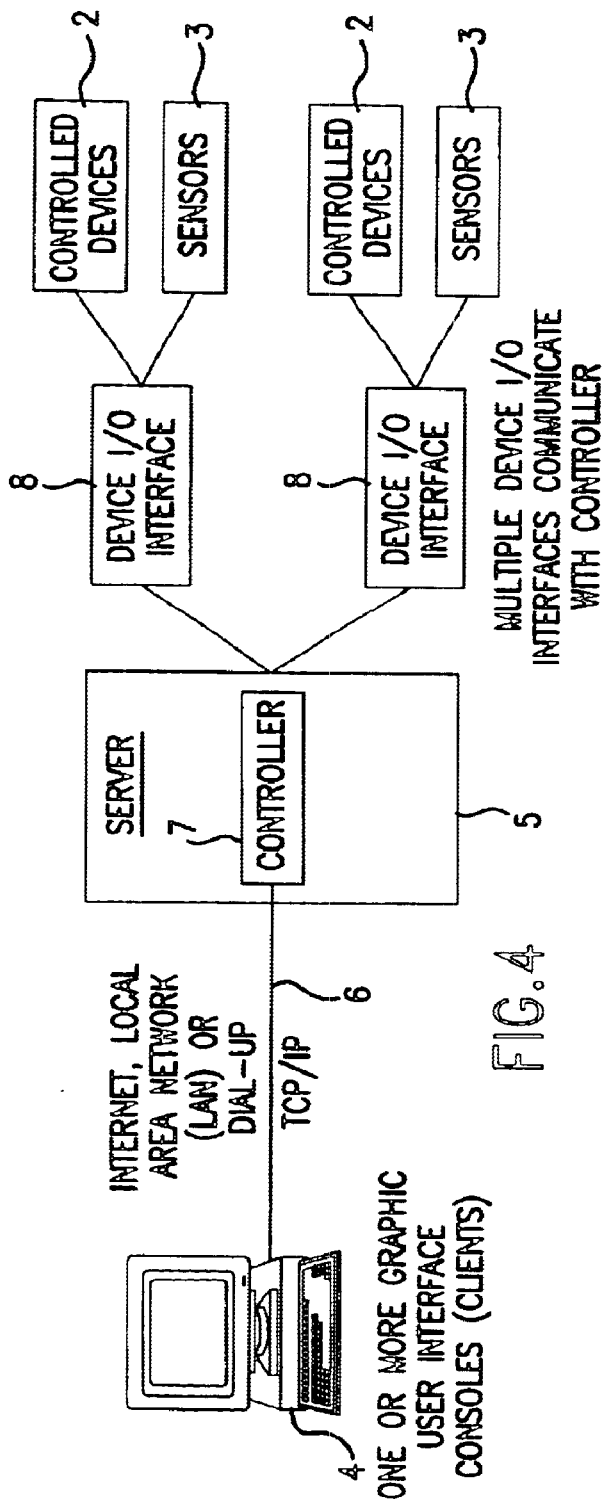
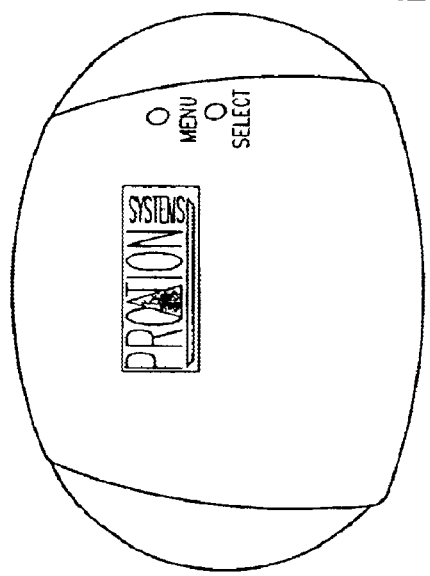

REMOTELY ACCESSIBLE ENERGY CONTROL SYSTEM

BACKGROUND AND SUMMARY OF THE INVENTION

The present invention is directed to a method and apparatus for remote control of electrical or electrically actuated systems, such as for example heating, ventilation and air conditioning (HVAC) systems, lighting systems, security systems, lawn sprinkler systems and the like.

Computerized automation systems can improve control over HVAC systems, and when combined with communicating thermostats, can result in reduced cost, as well as enhanced operational convenience and comfort. Communicating digital thermostats provide the reliability of conventional thermostats, plus the ability to communicate with an automation system. While such digital thermostats control heating and air conditioning on their own, they can also accept temperature set point changes from the computer controller and can send the current temperature and heating and air conditioning operating conditions to the computer controller, for the purpose of implementing a control regime.

Because communicating thermostats install in place of conventional thermostats, they may be used with different brands of HVAC systems. The relays in these thermostats replace the contacts inside a conventional thermostat. The HVAC system operates as it would with conventional thermostats, including special features, but with the added control of the computer system. Software in the computer controller uses information from the thermostats, along with time of day schedules, outside weather conditions and interior conditions to improve management of the HVAC systems. Such energy control systems therefore can include, for example:

- Multiple temperature changes throughout the course of a day, with separate schedules, for example, for days of the week and holidays.
- Separate temperature schedules for each of the thermostats included in the HVAC system
- Preheating and precooling of environmentally controlled spaces during periods of low energy cost, depending on the outside temperature and the actual local interior temperature
- Computer enforced limits on the amount by which a temperature can be changed, and for how long; and
- Tie-in between the security system and the energy control system.

In automated, centrally controlled systems such as described above, the status of all thermostats can be monitored centrally from a computer controller. Typically, icon displays show the current temperature, as well as heating and cooling set points for each thermostat included within the system, together with its operating mode (off, heat, cool, auto) and other information. Each of the respective thermostats is then separately controllable from the central location.

An important feature of systems such as described above is that, with appropriate communications capacity, the HVAC system can be monitored, and settings changed, over an internal network, via the Internet, or by dialing into the energy controller. Such remote operation can improve service, and save trips to the operating site. Remote access is typically secured by the use of special software, codes and passwords.

Known energy control systems of the type described above have been implemented using either a dedicated processor or a PC as a system control unit. Remote accessibility is then provided only via a proprietary software protocol, or by a slow generic PC communications products, which are commercially available for linking PC's via the Internet. One communication package which is available for this purpose, for example, is known as pcAnywhere™. FIG. 1, for example, illustrates this type of control system, using a PC for the central control unit. In this embodiment, a PC controller 1 controls a plurality of controlled devices 2 using information supplied by the control devices, as well as by a suite of sensors 3, which provide information concerning local ambient conditions at each of the control devices. The PC controller in this case provides an "all-in-one" system, which includes not only a system control database, monitoring and control logic and an interface to the control devices 2, but also the hardware and software for graphic user interface. As noted previously, remote access to the system controller PC can be obtained only by a proprietary protocol or a dedicated or dial-up communications line.

FIG. 2 shows a second embodiment of an energy control system according to the prior art, which is similar to the embodiment shown in FIG. 1, except that in place of a PC, a dedicated processor 1a is used.

Each of the foregoing prior art systems suffers from a number of common deficiencies. In particular, and most importantly, communications between a remotely situated PC and the system control PC is extremely slow and unreliable. As a practical matter, such systems can be very inconvenient in use. In addition, the prior art systems described above do not provide a built-in security system which constrains actions that may be taken by a user who has logged into the system via the remotely situated PC. And finally, the controller itself must be either a PC or an equivalent dedicated processor, which is capable of performing all of the functions previously described, including processing for graphic user interface display and processing of input actions taken by a system user; this in turn necessitates the use of equipment having sufficient computing and memory capacity to accommodate such tasks. Accordingly, such systems are costly.

One object of the present invention is to provide an energy control system which is easily and conveniently accessible from a remote location.

Another objection of the present invention is to provide an energy control system in which the functionality of the central control processor is limited, so that low cost computer equipment can be used, without requiring a monitor, keyboard and mouse.

Still another object of the present invention is to provide a control system in which graphic user interface functionality is performed outside the central control unit itself, so that different operating systems may be used for monitoring and control processing on the one hand, and for graphic display processing on the other hand.

Yet another object of the invention is to provide such a control system, which can operate on an embedded processor, without requiring moving storage devices, such as hard drives, floppy or "zip" disk drives, or CD-ROM drives.

Still another object of the present invention is to provide a remotely accessible energy control system in which input/output interfaces between the control processor and the control devices operate on multiple, small, low-cost processors, separate from a control logic and user interface software.

These and other objects and advantages are achieved by the energy control system according to the present invention, in which an advanced remotely accessible energy control system utilizes a client/server software architecture, and an "open" communication protocol that is compatible for communication via a worldwide computer network (such as is commonly referred to as the "Internet"); for example, the well known TCP/IP protocol for design-in remote accessibility. In the control system according to the invention, multiple graphic user interface clients can operate on widely available computers incorporating operating systems which are well suited to graphic user interface functions, while the energy control server and the input/output interface components can operate on a separate computer, using other or different operating systems, which are adapted to the processing performed there.

According to the invention, the graphic user interface software is resident on one or more graphic user interface consoles or clients, so that processing for formatting data for display, and processing of input actions taken by a system user are offloaded from the server to the graphic user interface clients. Data describing the format of the display are stored on the server, so a user can move the graphic user interface software to another computer, connect to the server and view the system information, without transporting files describing the format of the display.

Communication between the graphic user interface clients and the server is substantially limited to energy control data and display parameters, such as coordinates at which a device icon is to be displayed. In other words, with the architecture described previously, it is unnecessary for the server to have the capacity to do processing for graphic display of data, or processing of input actions taken by the users, these functions being performed exclusively on the graphic user interface clients. Thus, it is also unnecessary for the server to communicate pixel representations of the display to the client, such as is necessary in the case of generic, third party remote access software, in which all processing is done on the central control unit.

In addition, the energy control system according to the invention also provides a further degree of security that is unavailable in prior art systems, by limiting the range of actions that may be taken by a remote operator via the client PC. That is, in the system according to the invention, communication between the client and server is performed by means of a lexicon of predesignated or "designed in" messages that limit the actions which the remote operator can take to functions affecting the operations of the controlled devices, excluding modifications to the operation and contents of the server itself. Only administrative and maintenance personnel have access to the operation and contents of the server itself.

Other objects, advantages and novel features of the present invention will become apparent from the following detailed description of the invention when considered in conjunction with the accompanying drawings.

BRIEF DESCRIPTION OF THE DRAWINGS

FIG. 4 shows a second embodiment of an advanced remotely accessible energy control system according to the invention;

FIG. 5 is a perspective view of a server unit which is suitable for use in the present invention;

DETAILED DESCRIPTION OF THE DRAWINGS

System Overview

Figure 1:
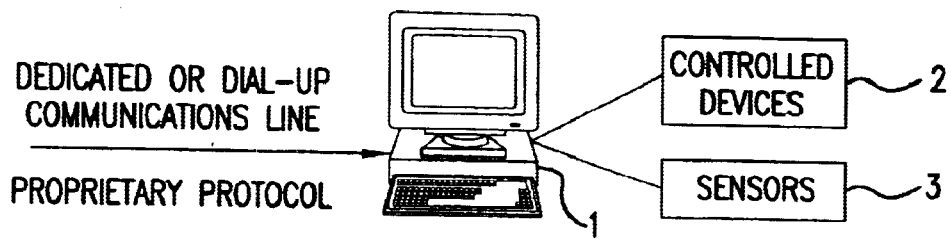
FIG. 1 is a schematic depiction of a centralized control system using a PC, according to the prior art.
Figure 2:
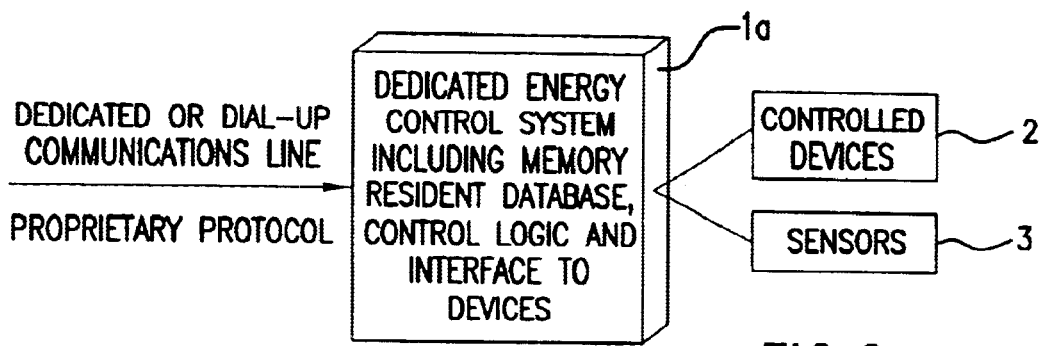
FIG. 2 shows a second embodiment of a prior art control system.
Figure 3:
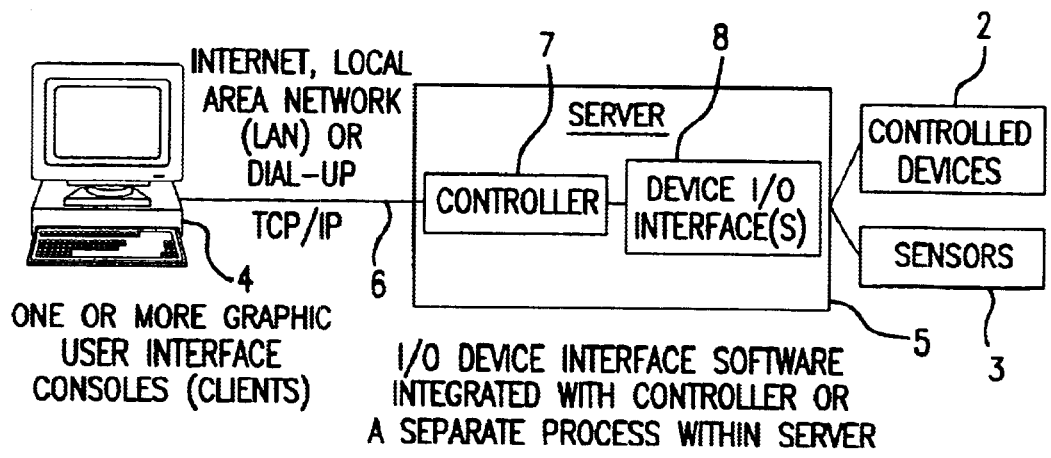
FIG. 3 shows a first embodiment of the advanced remotely accessible energy control system according to the invention.

FIG. 3 is a diagram which illustrates one embodiment of an advanced remotely accessible energy control system according to the invention. In this embodiment, a plurality of graphic user interface consoles 4 (that is, "Clients", of which only one is shown in the drawing) communicate with a server 5, via an Internet compatible protocol 6 such as the known TCP/IP protocol, using a lexicon of predesignated or "designed in" messages defined in at least one of the client and server units, thereby providing a limited range of commands that may be transmitted by a remotely situated operator. (It is of course apparent that such communication may also be performed using other Internet compatible protocols, or by a local area network or LAN.) The controller 7 and the device I/O interface software 8 operate on the same processor. The device I/O interface software can be integrated within the controller software or implemented as a separate program. In the latter case, the controller software and the device I/O interface software communicate using interprocess communications (IPC) methods such as pipes, queues, or sockets.

Multiple graphic user interface consoles 4 can communicate with the server 5 simultaneously, when the server is operating on a processor with sufficient speed and memory. Alternatively, multiple graphic user interface consoles can communicate with the server sequentially.

As noted previously, the graphic user interface software, resident on the graphic user interface console, formats data for display and processes input actions taken by the user. This arrangement substantially reduces both the necessary computing and memory capacity required for the server, and significantly reduces the volume of information which must be transmitted between the server and the graphic user interface clients. As a result, the server does not require a pointing device, such as a mouse, a large keyboard or a large display. Technical support or administrative personnel can operate and update the server remotely using widely available software, such as the well known telnet and ftp programs. Furthermore, the software (graphic user interface, controller and device I/O interface) have communication functionality built in, so that a third party software program is not required. Accordingly, the server can operate on a very small computer, without requiring moving storage devices.

FIG. 4 illustrates a second embodiment of the present invention. In this embodiment, the device input/output interface has been implemented in one or more processors which are separate from the controller. The controller and device I/O interfaces communicate using an Internet compatible protocol such as TCP/IP. This configuration facilities energy control of very large numbers of controlled devices. The device I/O interfaces can be deployed in small, low-cost processors and communicate with the controller over a network. The device I/O interfaces can be located, for example, in the various wings of multiple floors of a large hotel.

In the embodiments of both FIGS. 3 and 4, the controller 7 stores databases concerning the control devices, sensors and energy control parameters, and provides time-of-day scheduling of devices. It also provides logical processing to monitor and control the controlled devices, as well as communications with the graphic user interface clients and the device input/output interface 8, via an Internet compatible protocol. While it also stores parameters used to display the elements of the energy control system on a graphic user interface, it does not include or require software, computing capacity or memory capacity necessary for the processing of data for display by the graphic user interface.

The graphic user interface client 4, on the other hand, displays the status of control devices and sensors for user monitoring. It also provides a vehicle for the user to enter changes to current control settings or control parameters and permits designers to add, remove, or otherwise adjust the attributes of the control devices and sensors. Finally, it communicates with the controller server via an Internet compatible protocol, as described previously.

The device I/O interface 8, which may be integrated with the controller software, implemented as a separate program, or resident on a separate computer, converts commands from the controller into messages that are sent to the control devices. It also converts status information from the control device and readings from the sensors into messages to the controller.

As noted previously, the controlled devices 2 may include communicating thermostats, hardwired relays, power line carrier (PLC) relays, dimmers, and other communicating devices. Finally, the sensors 3 may include the following: temperature, humidity, pressure, air flow, light level, voltage, electrical current, and clerical power.

System Details

Implementation of the system described above utilizes a very small network server to provide a simple, low cost energy control server and PC software for the graphic user interface. The PC software and the server communicate via the common TCP/IP protocol. The server, in this case may utilize contains a 386 class processor running at 33 megahertz, 8 megabytes of flash memory, 8 megabytes of random access memory (RAM), an Ethernet network port with a well known RJ-45 connector, an RS-232 serial port for communicating with controlled devices and a modem with an RJ-11 connector for a telephone line. A suitable server contains an LCD display with two lines of 16 characters each, two push buttons and a programmable LED. Other processors, memory, devices and operating systems may also be used.

The server contains an embedded version of the well-known Linux™ operating system available from RedHat, Inc. of Durham, N.C. and a DiskOnChip device provided by M-Systems of Newark, Calif. that enables Linux to utilize the flash memory via the normal Linux file system. This enables application software to be developed on a PC running Linux and transferred into the server via the well-known File Transfer Protocol (FTP) Normally, the flash memory is operated in read-only mode for improved reliability and changed to read-write mode only when software or data are being loaded or updated. The change between read-only and read-write operation can be done by an operator or by the application software running on the server.

Server software, such as the well known Telnet, in the small server enables an operator to operate and update the server remotely.

Figure 6:
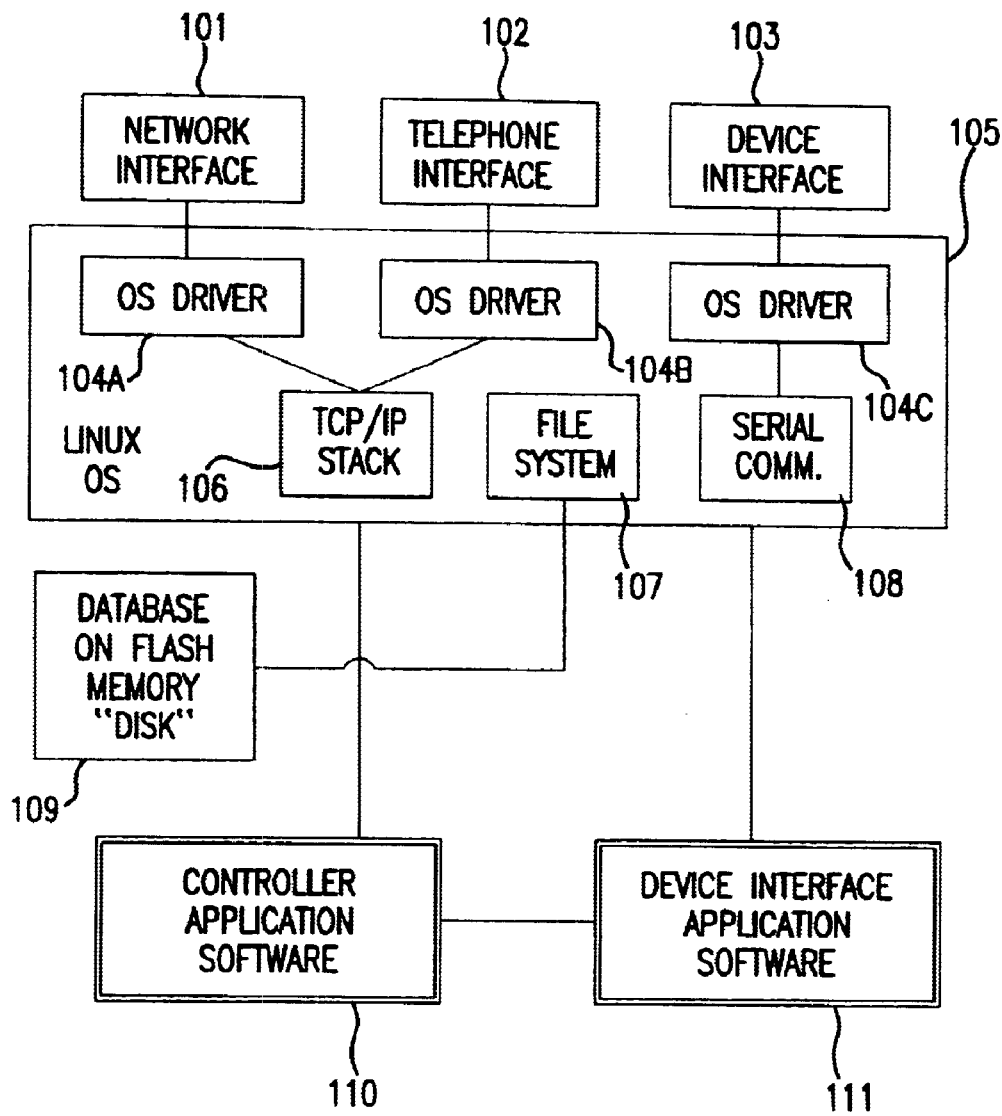
FIG. 6, is a block diagram which illustrates the components of a server unit suitable for use according to the invention.

As shown in FIG. 6, in addition to the processor, memory and local input-output devices as described above, the logical components of the small server include:

An Ethernet compatible interface 101 for connection to a network,

A modem 102 for inbound or outbound telephone communication,

Software drivers 104A,104B to interface the Ethernet compatible interface and the modem to Linux, A TCP/IP stack 106 to enable the use of TCP/IP for communication internally, over the network or over the modem, A database 109 describing the devices being controlled and the control schedules and other control parameters, A file system 107 to interface the operating system to the application software, Application controller software 110 providing functions to load and update the database, time-of-day schedules to change thermostat temperature settings and to turn devices, such as lights, on and off when desired, limitations on how much and how often thermostat settings can be changed and how often devices can be turned on and off (e.g., for short cycle protection), message processing functions for exchanging information with the user interface and message processing functions for exchanging information with the controlled device interface software, Application software 111 for interfacing with the controlled devices that receives messages from the application controller software, formats and transmits the appropriate messages to the controlled devices to carryout changes as directed by messages received from the controller, detects errors in the transmission to controlled devices, retries failed transmissions, notifies the controller software when transmissions have failed, receives messages from the controlled devices acknowledging transmissions, receives messages from the controlled devices of changes in conditions at the controlled devices (such as a change in room temperature or of a change in setting made manually at the device) and that notifies the controller software of these occurrences.

A serial port interface 108 or communication to external devices, and an associated driver 104C, and Serial communication utility software to interface the application program to the operating system.

Internally, the various Linux processes communicate via an Inter Process Communication (IPC) message queue. One process sends a message, along with a destination identifier, to the message queue using the msgsnd Linux/Unit function. The other process uses the msgrcv Linux/Unix function to wait until a message is received, after which the message is processed.

TCP/IP communications are implemented using the well know "sockets" functions. TCP/IP communications between a client and the server on the same computer, such as the controller and the device interface use the loop back IP address of 127.0.0.1.

The contents of the database, in-memory and "disk" resident, depend on the type of devices being controlled. The database is stored as a simple flat file, as all real-time access to the data are carried out using the in-memory form of the data. For simple devices, such as lights, controlled by relays the attributes in the database for each device can be the current on-off state of the device, the minimum time between changing from on to off or the reverse (the "short cycle" time) and the time of the last change. Also stored are the name of the unit, its address and the location at which it is displayed on the user interface (U.I.) screen.

For thermostats, more information is stored including: the current room temperature, the heat set point, the cool set point, the operating mode (Off, Heat, Cool, Auto or Emergency Heat for heat pumps), the fan mode (Auto or on), the current values of each relay (W1, Y1, W2, Y2, G, O, B), the status of auxiliary devices such as LED's along with the name of the thermostat, its address and the location at which it is displayed on the user interface (U.I.) screen. The current status information stored includes whether the device has verified the most recent settings sent to it. Additional information includes limitations on the number of times the temperature settings is allowed to be changed at the thermostat, the maximum time a change will be allowed to be in effect before being returned automatically to the scheduled value, the schedule value for the heat and cool set points and the latest time at which the heat or cool set point was changed at each thermostat.

Time of day schedules are stored as a two dimensional array with multiple entries for each day of the week and holidays. Each entry consists of the time of day and the value to be set at that time. The value can be "on" or "off" for devices such as lights and fans and the temperature for thermostats. The present system provides up to four time of day changes for each day of the week and four for holidays.

The user interface client utilizes a PC with an operating system providing a graphic user interface, such as the well-known Windows™ operating systems for The Microsoft Corporation or Linux with the Gnome or KDE graphic user interfaces. It uses Windows™ Sockets to establish the TCP/IP connection to the controller server. A separate thread is created to process messages via TCP/IP to and from the controller so that these can be sent and received asynchronously with other processing, such as display formatting and user input.

The information set from the controller contains the information required to determine the layout of the display, including the types and names of devices, the location on the display and the values of device attributes, but not the actual display contents itself. That is, the parameters needed to create the display are provided from the controller but the user interface software actually constructs the display, as discussed previously.

Figure 7:
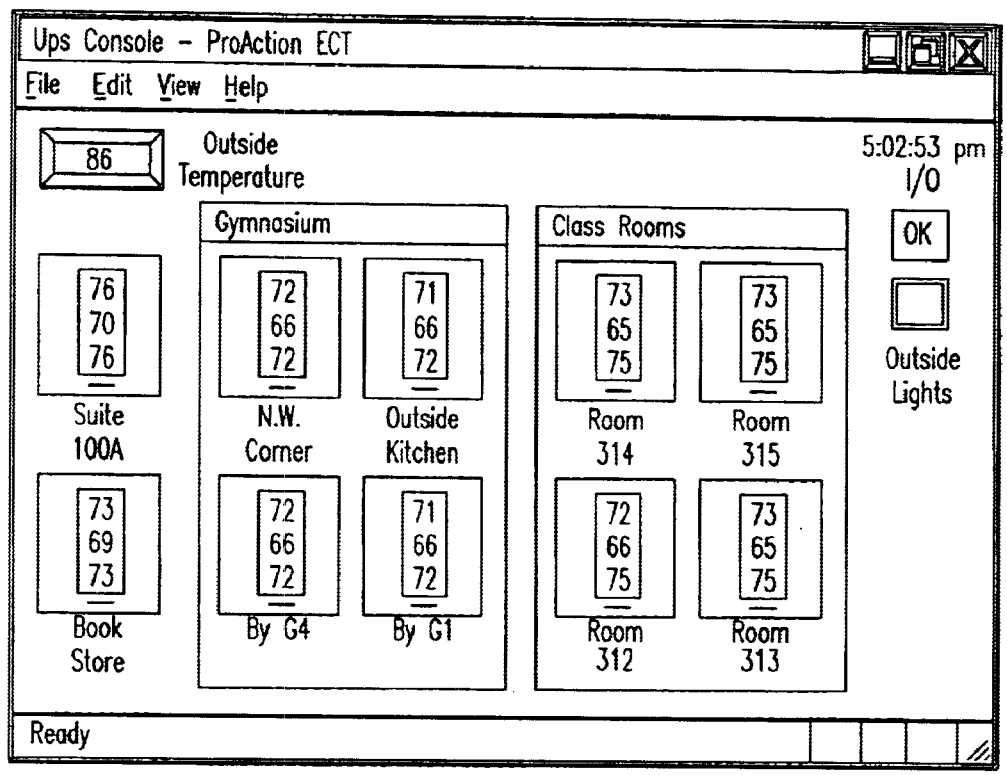
FIG. 7 illustrates a display showing icons for ten thermostats controlled by the system according to the invention.

The displays contain an icon for each unit being monitored or controlled. For some devices a unique icon is displayed for each device that shows the current attributes in an individual way in which the display designer can arrange the icons to best suit their needs. For example, FIG. 7 illustrates a display showing icons for ten thermostats, one outside temperature sensor and one relay to control outside lights. Eight of the ten thermostats are organized into two groups, Gymnasium and Class Rooms, to aid in easily changing certain settings.

Figure 8:
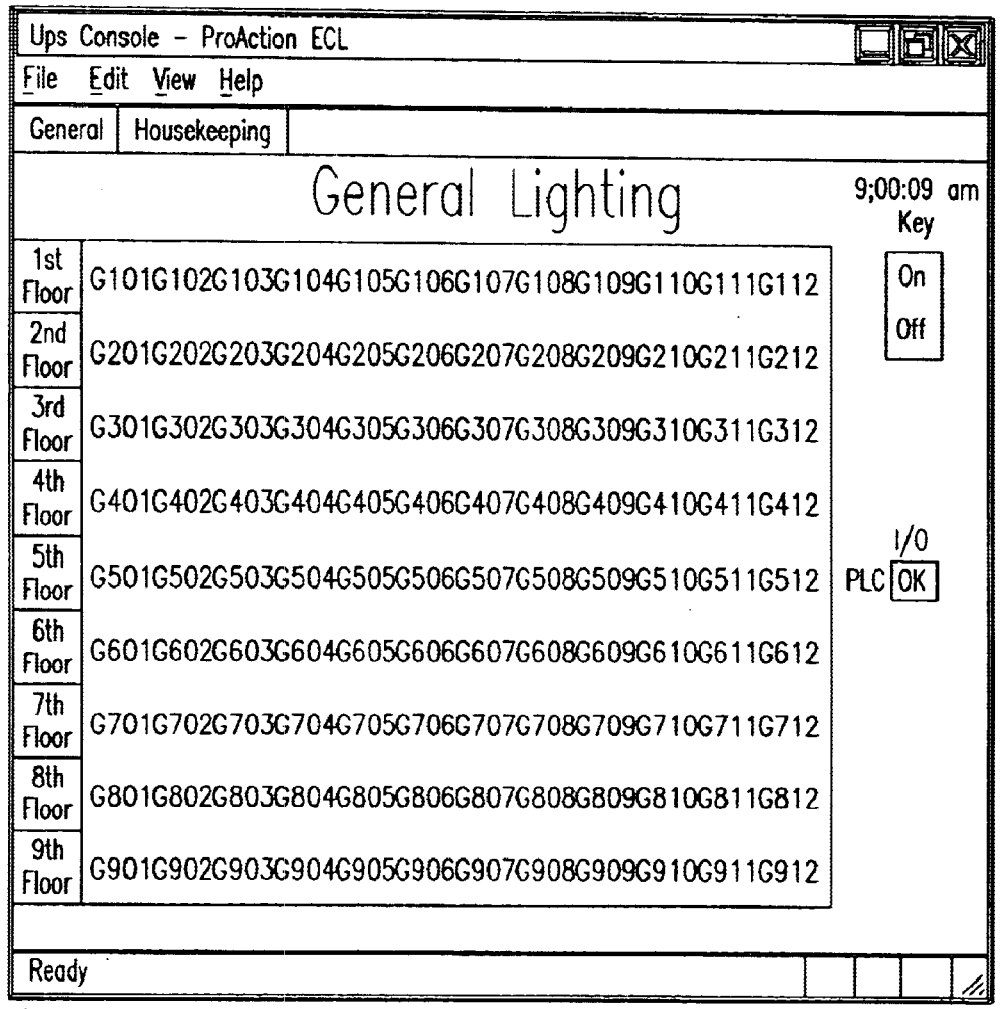
FIG. 8 illustrates an alternative embodiment of a display, showing the status of 108 electrical circuits.

Alternatively, a simple grid may be used to display simple devices, such as lights, or for showing a large number of devices on one display. For example, FIG. 8 illustrates a display showing the status of 108 electric circuits on one display page.

Figure 9:
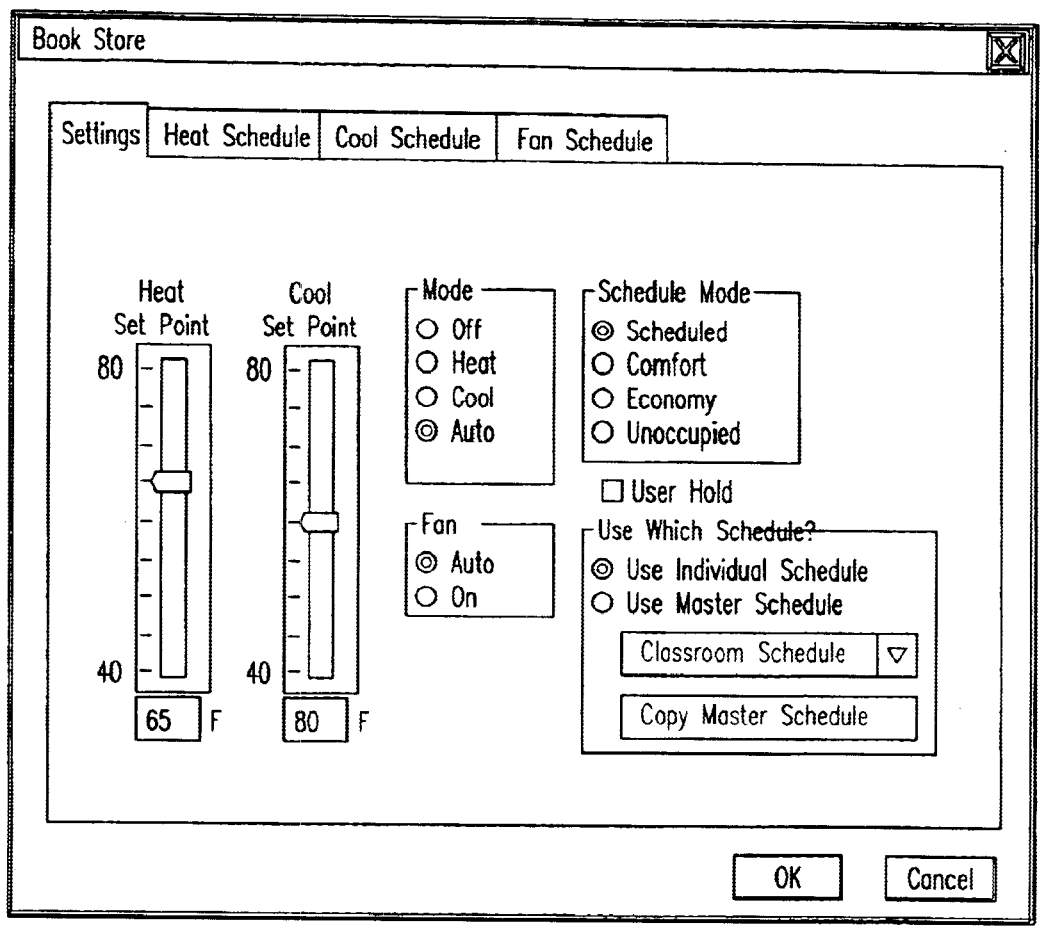
FIG. 9 shows a control panel for setting operating parameters for a control device.
Figure 10A:
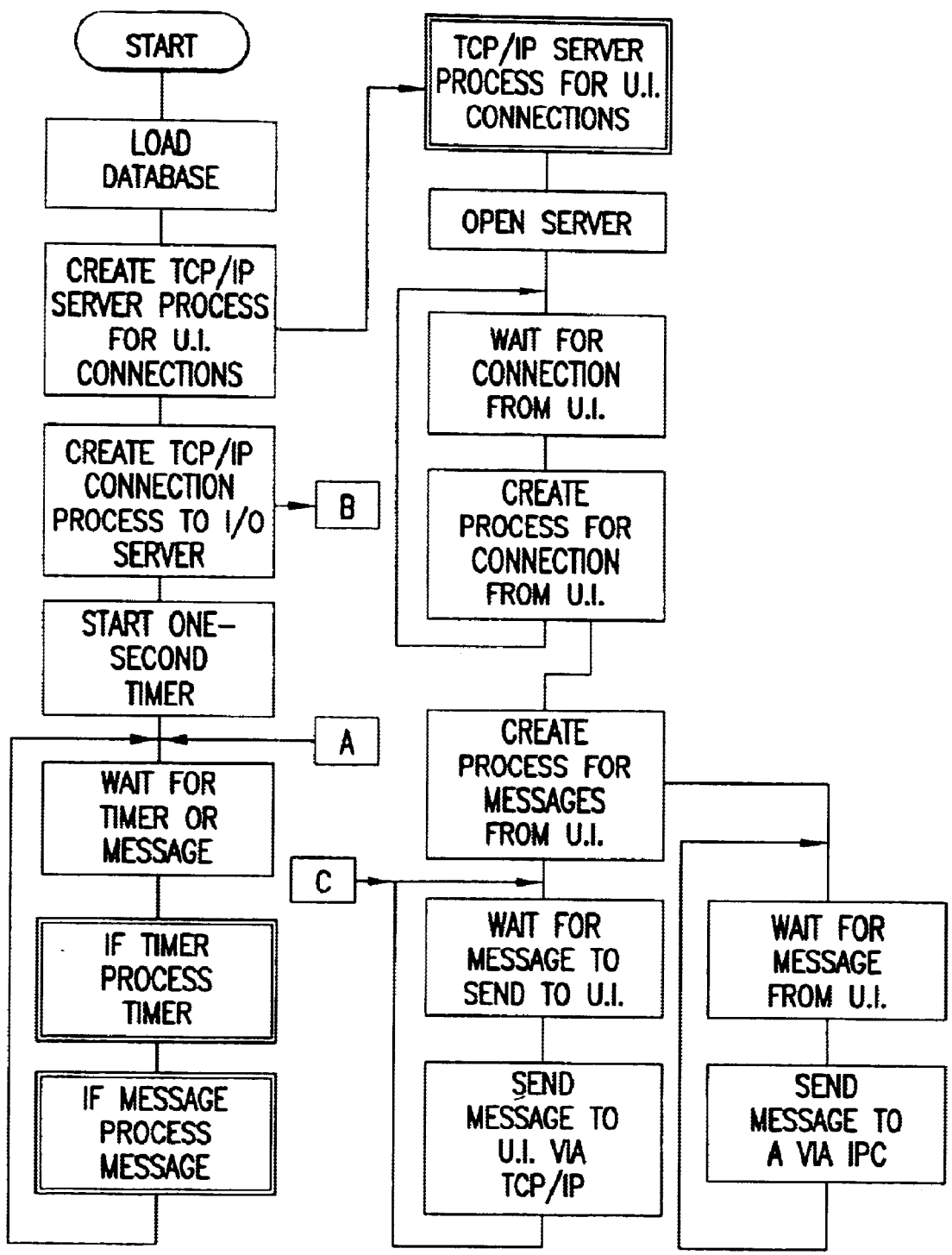
FIGS. 10A–10G show a flow chart for the controller application software for the server illustrated in FIG. 6.
Figure 10B:
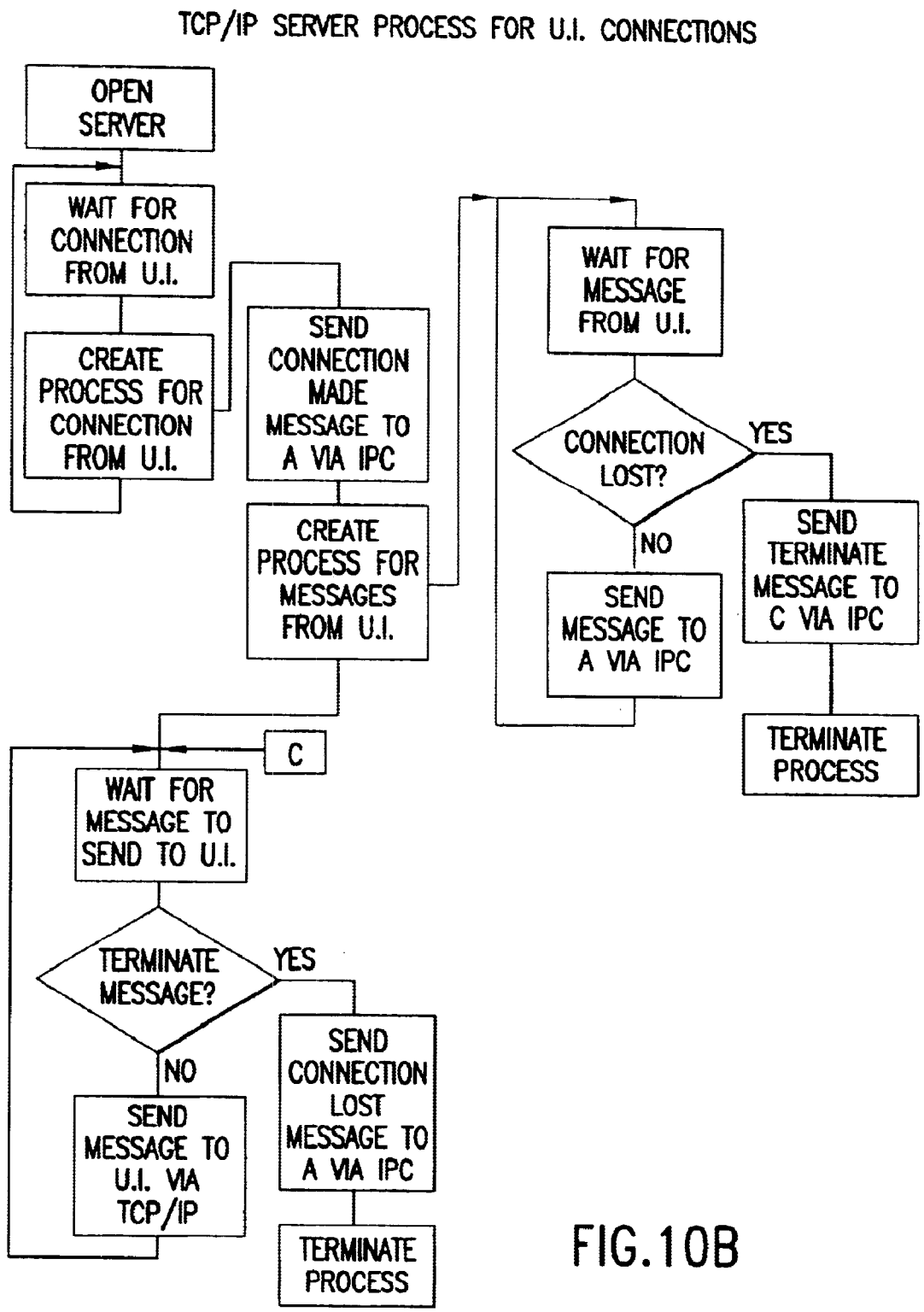
Figure 10C:
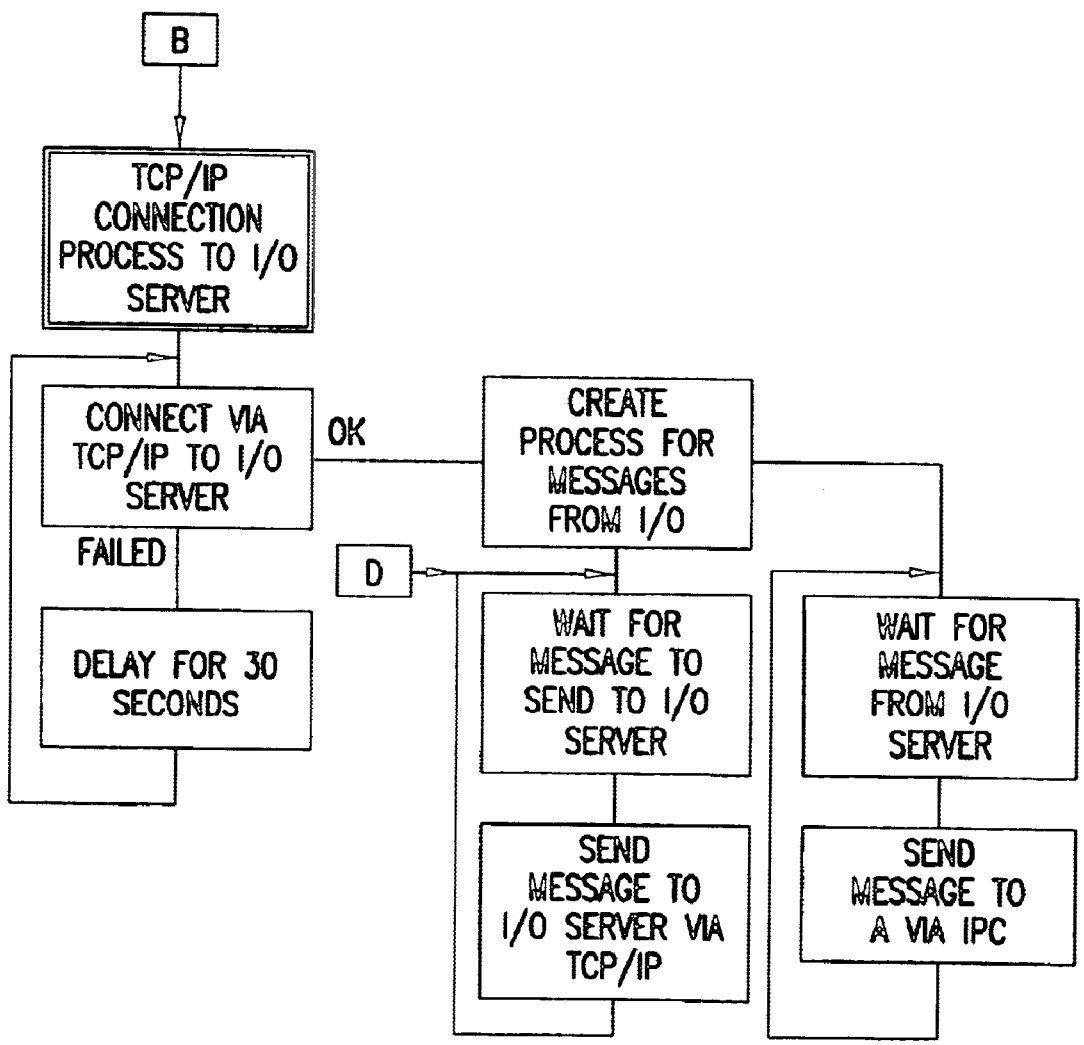
Figure 10D:
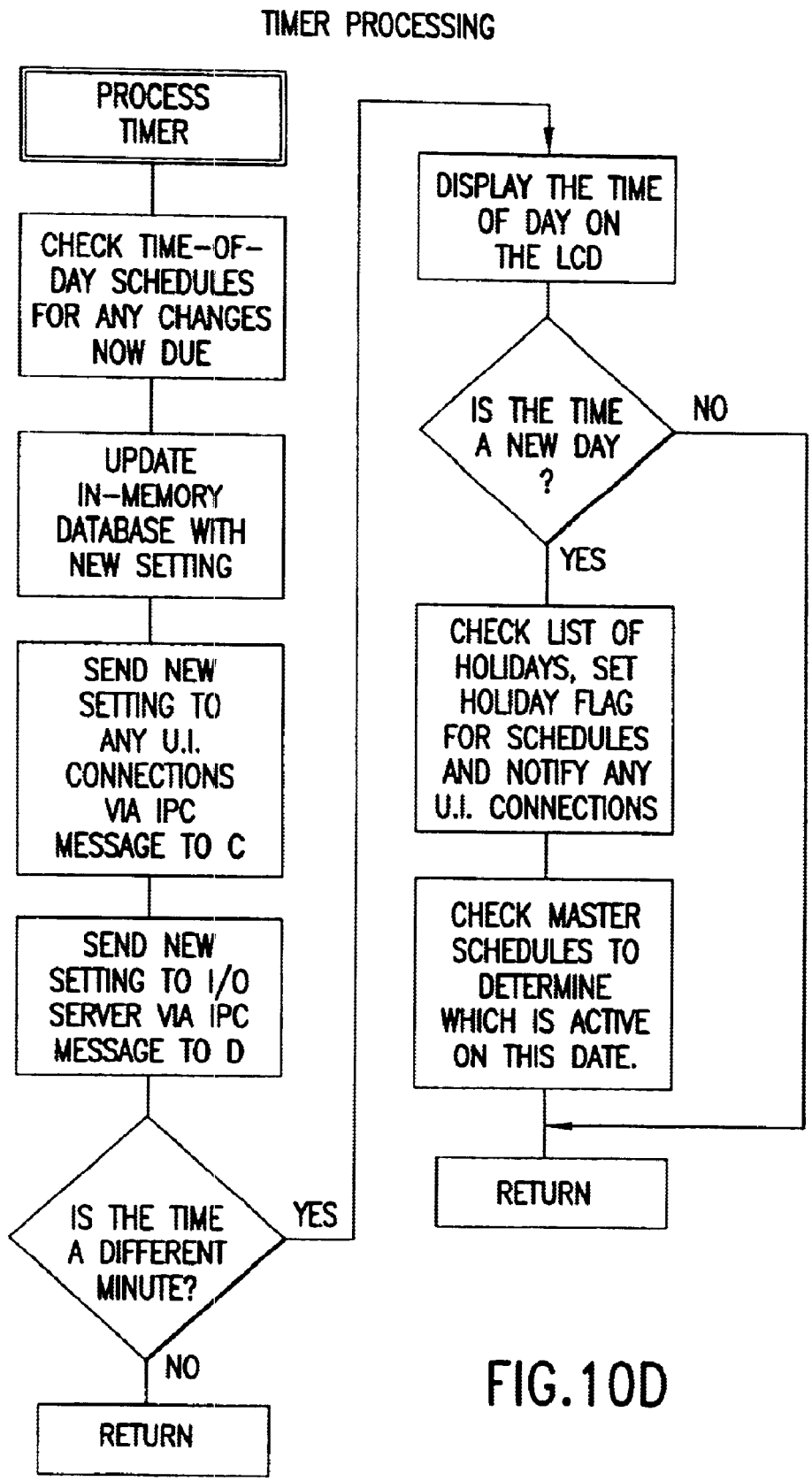
Figure 10E:
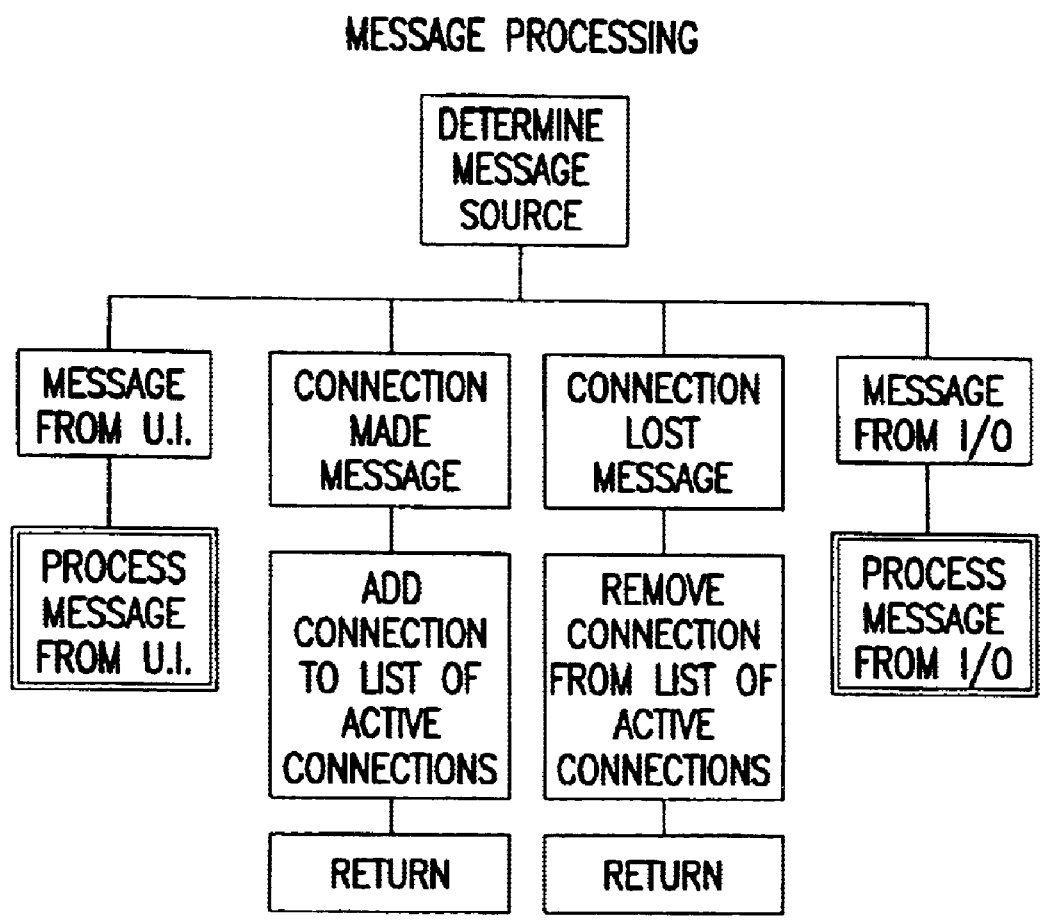
Figure 10F:
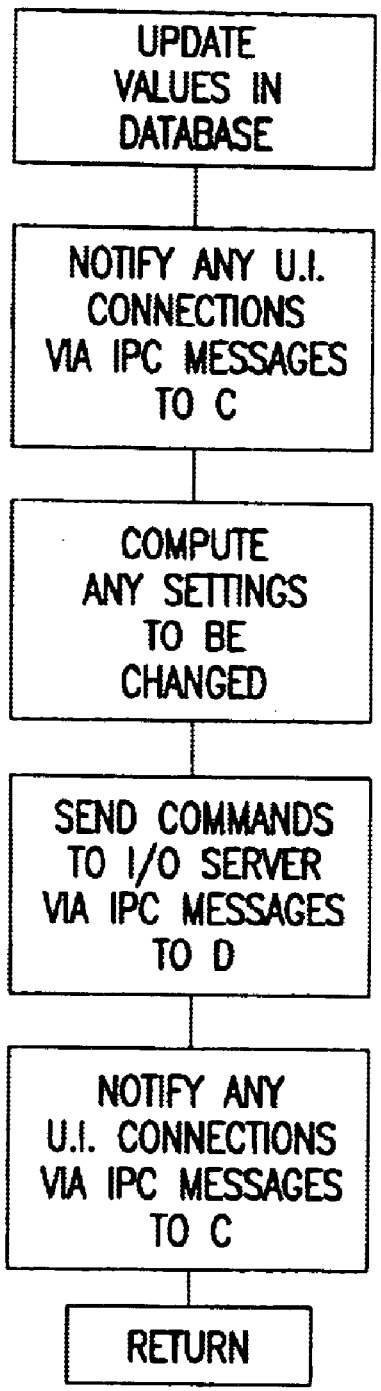
Figure 10G:
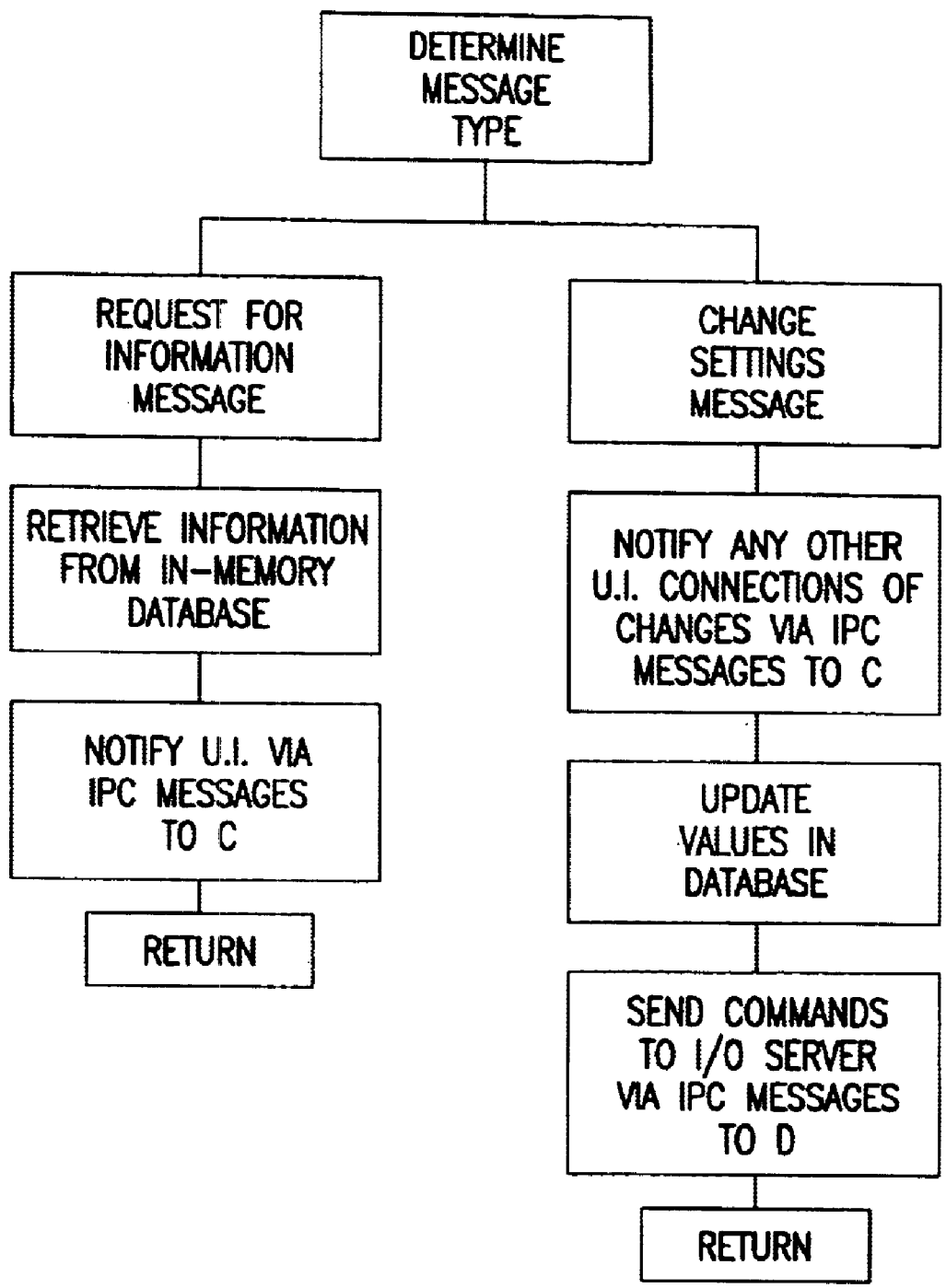
Figure 11A:
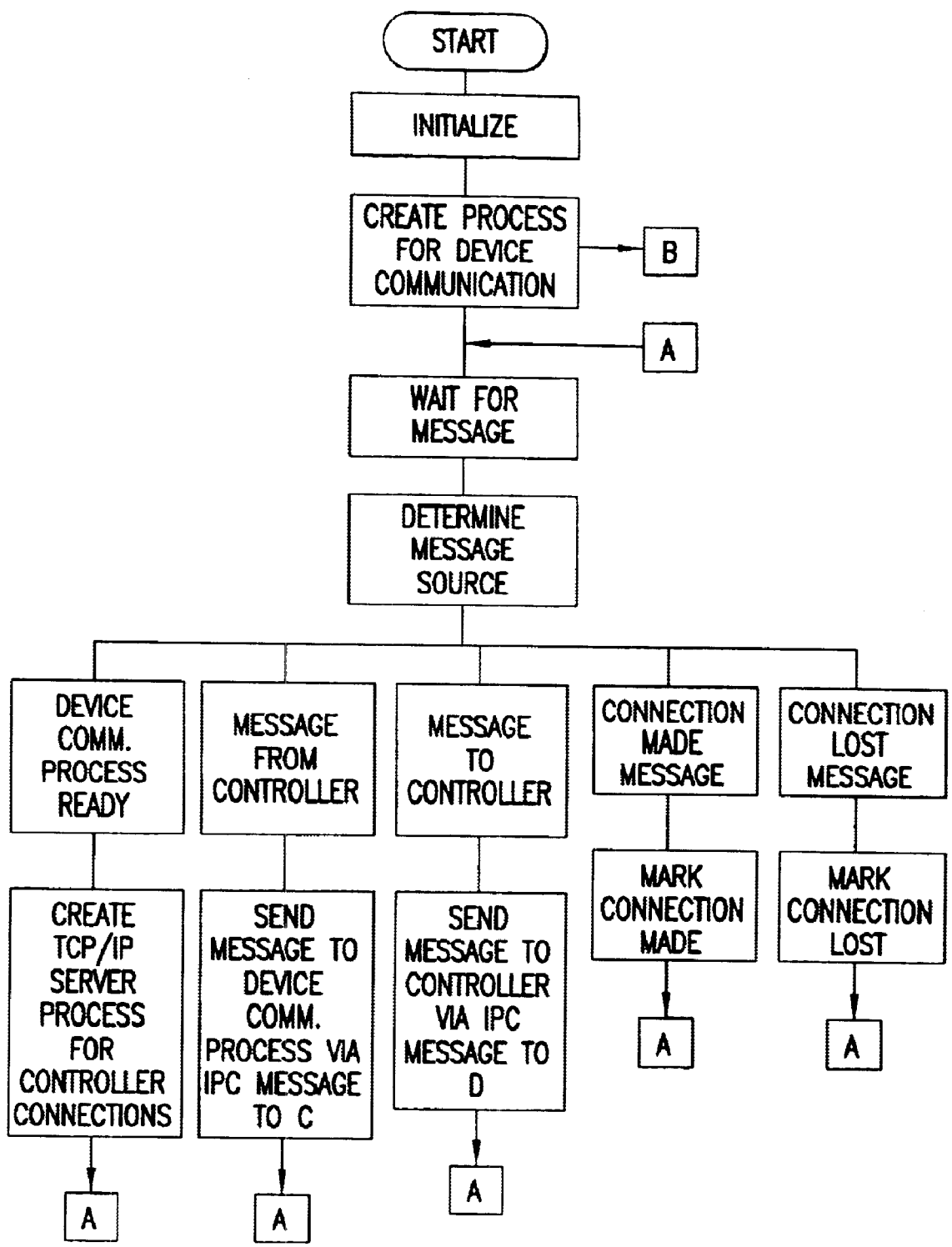
FIGS. 11A–11E show a flow chart of the device interface application software for the server shown in FIG. 6.
Figure 11B:
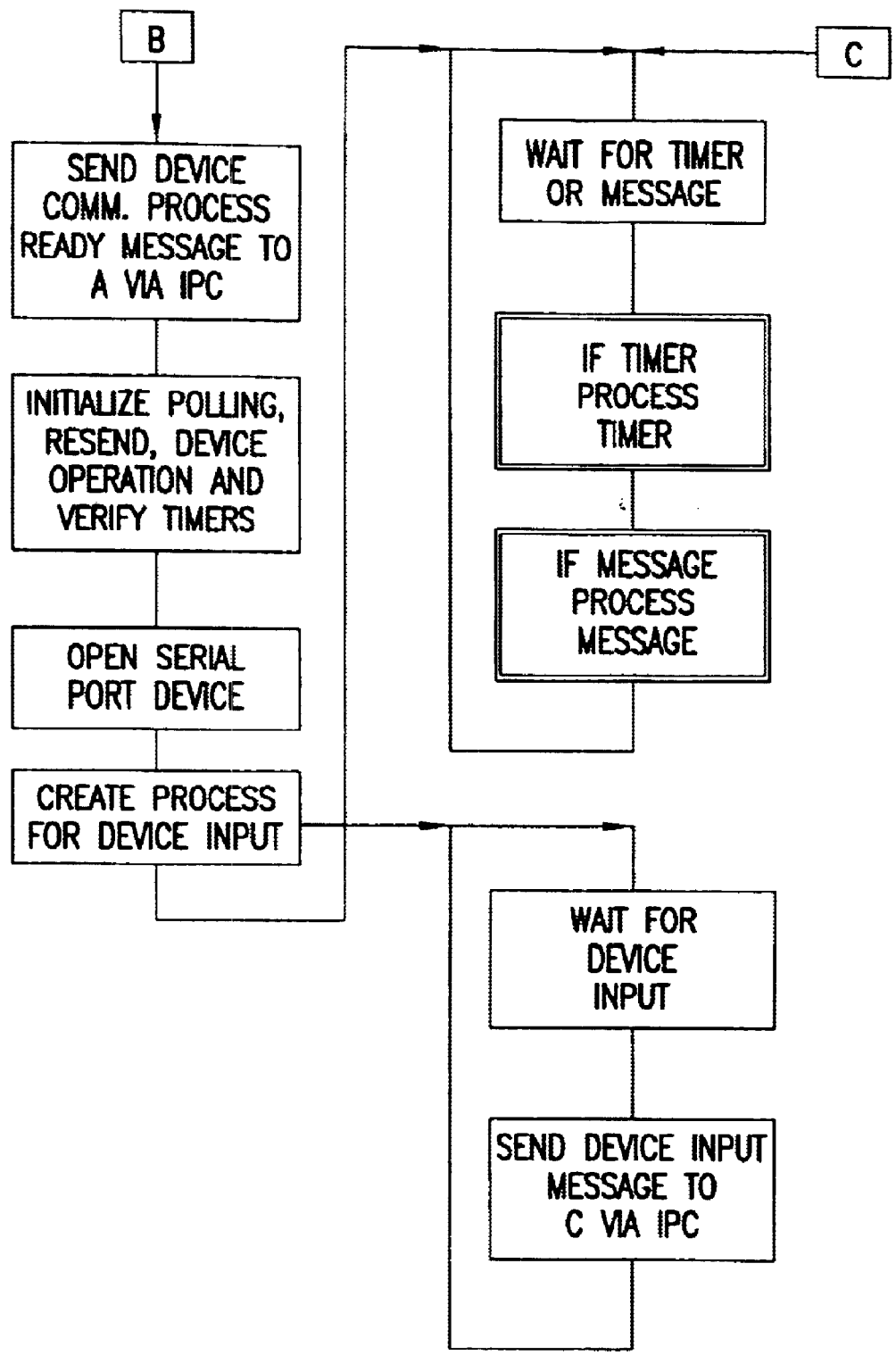
Figure 11C:
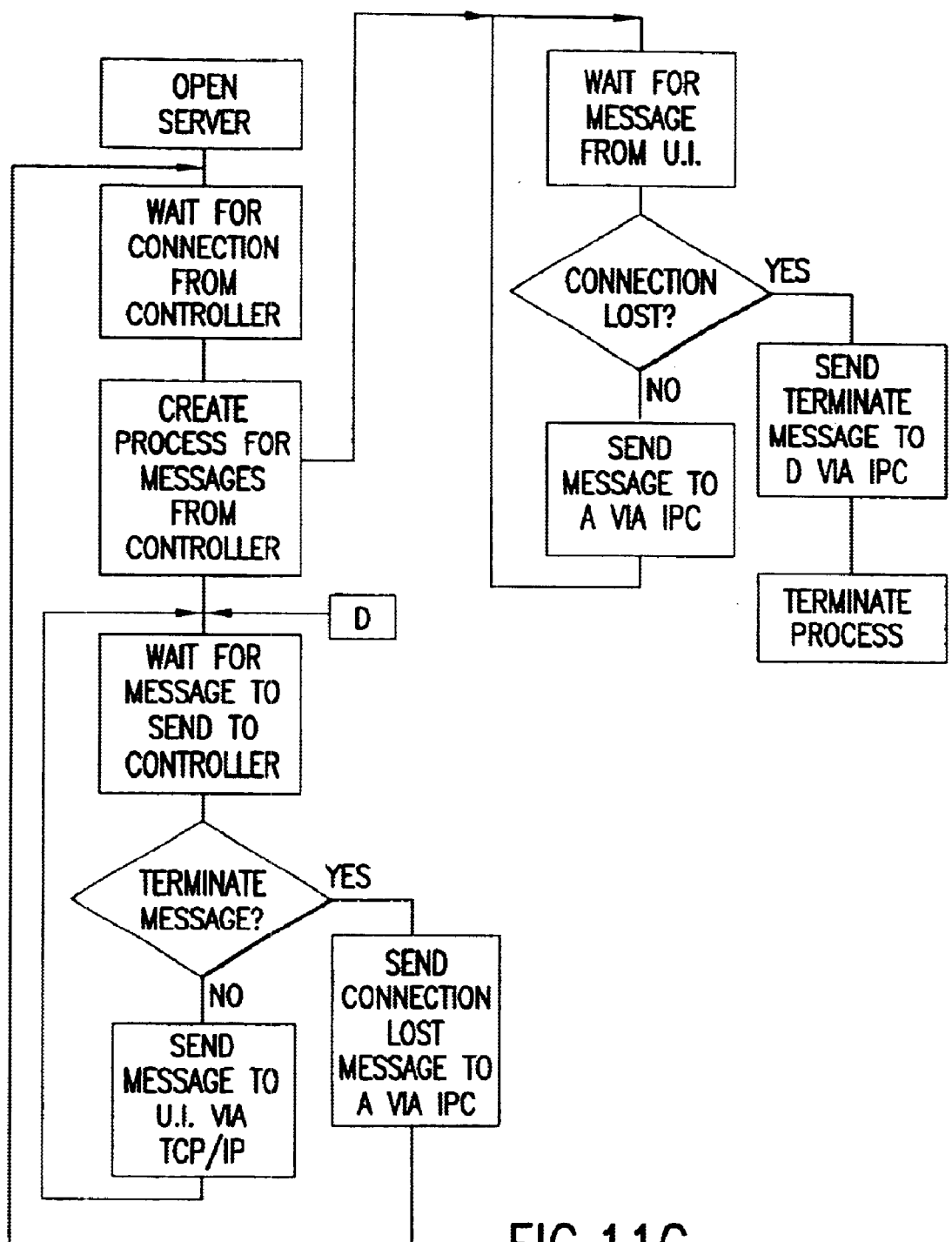
Figure 11D:
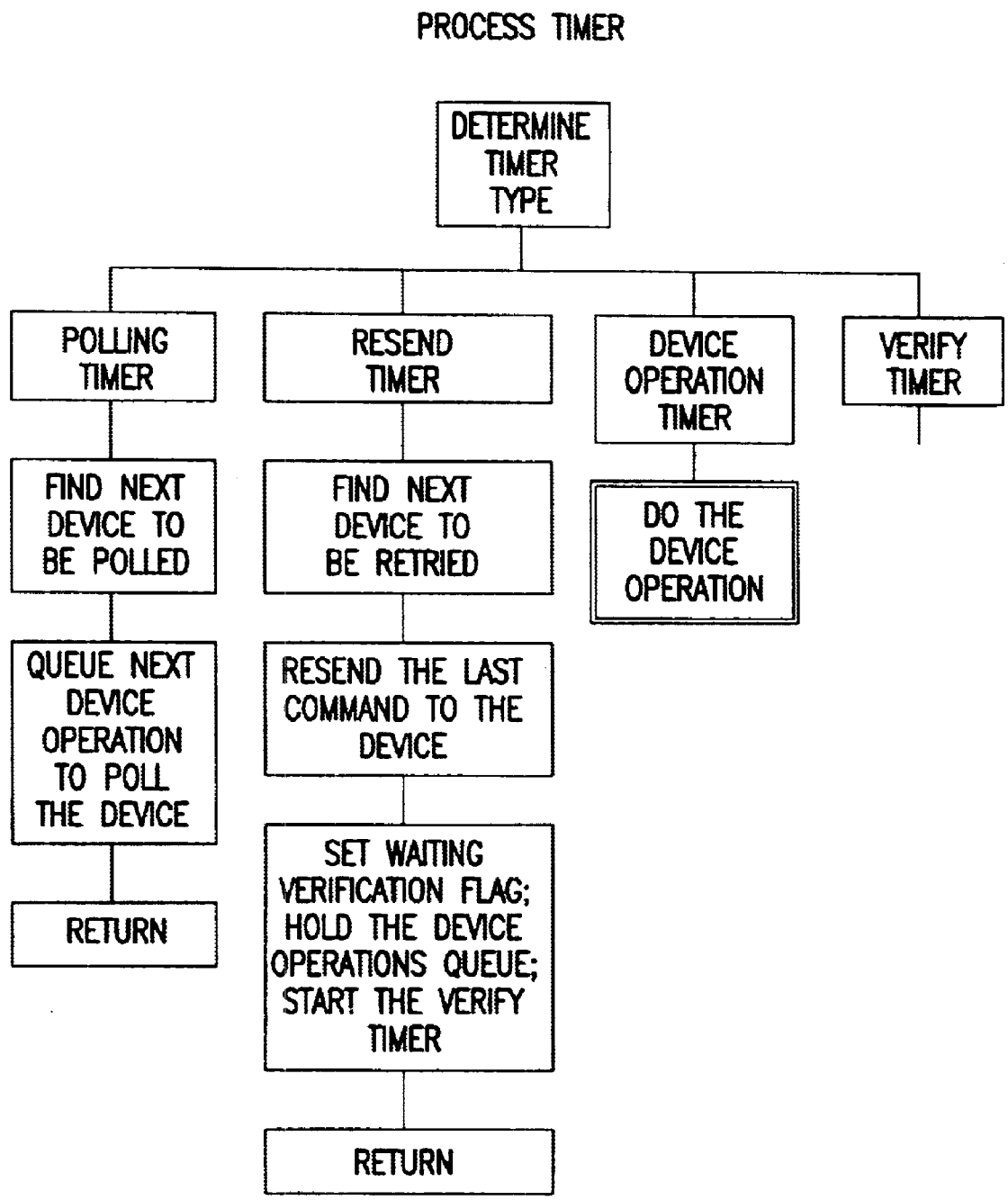
Figure 11E:
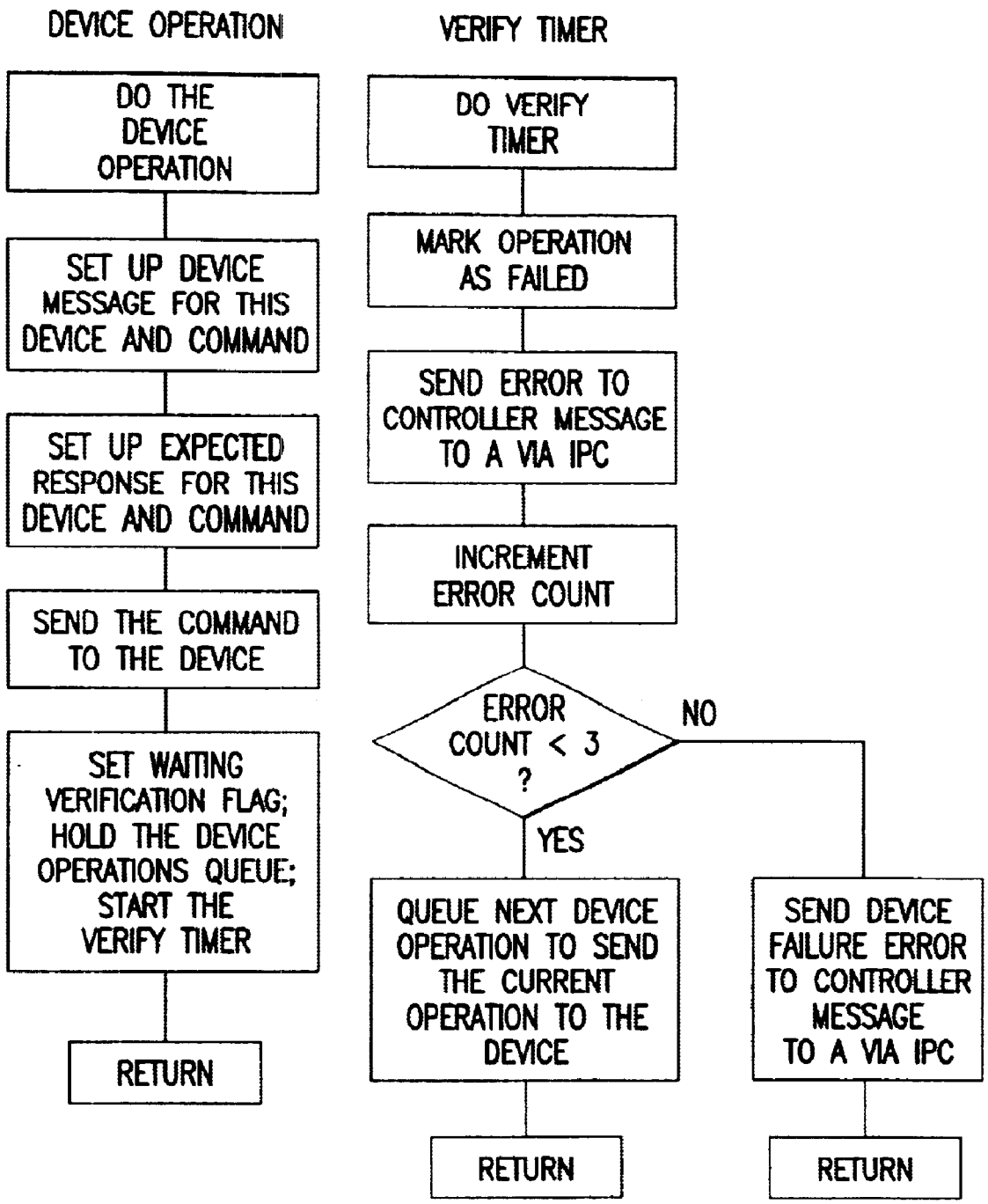

The settings for an individual device can be displayed by clicking the device icon. The resulting display shows a form containing a "control panel" for the device, as shown in FIG. 9.

FIGS. 10A–10G set show a flow chart for the controller application software for the small server illustrated in FIG. 6, and contains explanatory descriptors which will be readily understood and implemented by those skilled in the art. Finally, FIGS. 11A–11E show a flow chart of the device interface application software of FIG. 6, which will also be understood by those skilled in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for remotely controlling a plurality of controlled devices, comprising:

a plurality of sensors associated with said controlled devices for sensing local conditions for each such sensor;

a control processor which performs processing for controlling operation of said controlled devices, based on operational status information from said controlled devices, and local condition information from said sensors;

at least one device input/output interface for communication between said control processor, said controlled devices and said sensors; and at least one remote access unit for accessing said control processor via a communication protocol; wherein said system is configured with a client/server architecture, said control processor constituting a server and said at least one remote access unit constituting at least one client;

communications between said server, said at least one client and said at least one device input/output interface are implemented via an open communication protocol which is compatible for communication via a worldwide computer network;

graphic user interface software which performs processing for formatting of data received from said server, for dynamic display of conditions at said server, substantially simultaneously as such conditions vary over time, and processing of information input by a system operator, is resident on said at least one client; and communication between said graphic user interface software and said server consists substantially of system operator input information, real time control and status data, and display parameters.

2. The control system according to claim 1, wherein said plurality of controlled devices comprises components of at least one of a climate control system, a lighting system, a security system and a lawn sprinkler system.

3. The control system according to claim 1, wherein said plurality of controlled devices comprises at least one of communicating digital thermostats, hardwired relays, power line carrier relays and other communicating devices.

4. The control system according to claim 1, wherein said sensors sense at least one of temperature, humidity, atmospheric pressure, air flow, illumination level, voltage, electrical current and electrical power.

5. The control system according to claim 1, wherein said system operator input information is limited to messages selected from a predesignated lexicon of permissible messages defined in at least one of the client and the server.

6. The control system according to claim 1, wherein said server comprises:

a database of information concerning the controlled devices, control schedules for said devices and other control parameters for said devices;

application controller software providing functions to load and update the database, time of day schedules for controlled devices and operational limitations for controlled devices, and message processing functions for exchanging information with the user interface and with controlled devices; and application software for receiving messages from the application controller software, formatting and transmitting messages to the controlled devices, receiving messages from the controlled devices and transmitting information to said application controller software from said controlled devices.

7. The control system according to claim 6, wherein said graphic user interface software resident on said at least one client performs processing for formatting and display of control data received from said server, based on display parameters communicated by said server via said open communication protocol, and processes input information from said system operator for transmission to said server via said open communication protocol.

8. The control system according to claim 6, wherein said server comprises an embedded processor.

9. The control system according to claim 1, wherein said graphic user interface software resident on said at least one client performs processing for formatting and display of real time control data received from said server, based on display parameters communicated by said server via said open communication protocol, and processes input information from said system operator for transmission to said server via said open communication protocol.

10. The control system according to claim 1, wherein said server comprises an embedded processor.

11. The control system according to claim 1, wherein said display parameters communicated from said server to said graphic user interface software are variable by said system operator by manipulation of graphic symbols displayed on said client.

12. The control system according to claim 1, wherein said server uses an open source operating system.

13. A control system for remotely controlling a plurality of controlled devices, each of said controlled devices having at least one sensor for generating signals indicative of local conditions, said system comprising:

a server unit for logical processing to monitor and control said controlled devices, based on input information from said controlled devices and from sensors, and input information from a system operator; and at least one graphic user interface client coupled to communicate with said server via an open communication protocol that is compatible for communication via a worldwide computer network, said at least one graphic user interface client including graphic interface software which performs processing for formatting and dynamic display of real time control data received from said server, based on display parameters communicated by said server via said open communication protocol, and processes input information from a system operator for transmission to said server via said open communication protocol.

14. The control system according to claim 13, wherein said plurality of controlled devices comprises components of at least one of a climate control system, a lighting system, a security system and a lawn sprinkler system.

15. The control system according to claim 13, said plurality of controlled devices comprises at least one of communicating digital thermostats, hardwired relays, power line carrier relays and other communicating devices.

16. The control system according to claim 13, wherein said sensors sense at least one of temperature, humidity, atmospheric pressure, air flow, illumination level, voltage, electrical current and electrical power.

17. The control system according to claim 13, wherein said input information from the system operator is limited to messages selected from a predesignated lexicon of permissible messages defined in at least one of the client and server.

18. The control system according to claim 13, wherein said server comprises:

a database of information concerning the controlled devices, control schedules for said devices and other control parameters for said devices;

application controller software providing functions to load and update the database, time of day schedules for controlled devices and operational limitations for controlled devices, and message processing functions for exchanging information with the user interface and with controlled devices; and application software for receiving messages from the application controller software, formatting and transmitting messages to the controlled devices, receiving messages from the controlled devices and transmitting information to said application controller software from said controlled devices.

19. The control system according to claim 18, wherein said server unit comprises an embedded processor.

20. The control system according to claim 13, wherein said server unit comprises an embedded processor.

21. The control system according to claim 13, wherein said display parameters communicated from said server to said graphic user interface software are variable by said system operator by manipulation of graphic symbols displayed on said client.

22. The control system according to claim 13, wherein said server uses an open source operating system.

23. A method for remotely controlling a plurality of controlled devices, each of said controlled devices having at least one sensor for generating signals indicative of local operating conditions, said method comprising:

performing logical processing for monitoring and controlling said controlled devices in a server unit which is coupled in communication with said plurality of controlled devices;

in at least one graphic user interface client, performing processing for formatting and display of real time control data received from said server, based on display parameters communicated by said server unit, and processing input actions taken by an operator of said at least one graphic user interface client, for transmission to said server; and performing communication between said server and said at least one graphic user interface client via an open communication protocol that is compatible for communication via a worldwide computer network, said communication consisting substantially of system operator input information, real time device control and status data, and display parameters.

24. The control method according to claim 23, wherein said plurality of controlled devices comprises components of at least one of a climate control system, a lighting system, a security system and a lawn sprinkler system.

25. The control method according to claim 23, wherein said plurality of controlled devices comprises at least one of communicating digital thermostats, hardwired relays, power line carrier relays and other communicating devices.

26. The control method according to claim 23, wherein said sensors sense at least one of temperature, humidity, atmospheric pressure, air flow, illumination level, voltage, electrical current and electrical power.

27. The control method according to claim 23, wherein said system operator input information is limited to messages selected from a predesignated lexicon of permissible messages defined in at least one of the client and the server.

28. The method according to claim 23, wherein logical processing for monitoring and controlling said controlled devices is performed by an embedded processor.

29. The control system according to claim 23, wherein said display parameters communicated from said server to said graphic user interface software are variable by said system operator by manipulation of graphic symbols displayed on said client.

30. The control system according to claim 23, wherein said server uses an open source operating system.

31. A remotely accessible system control, comprising:
a server processor unit having application software resident thereon for performing processing for controlling said system;
a client processor having graphic user interface software resident thereon for performing processing for display of real time control information received from said server processor unit, based on display parameters provided by said server processor unit, and for receiving input control information from a system operator;
an open communication protocol that is compatible for communication between said server unit and said client via a worldwide computer network, said communication consisting substantially of system operator input control information, system control and status data, and display parameters.

32. The control system according to claim 31, wherein said system operator input control information is limited to messages selected from a predesignated lexicon of permissible messages defined in at least one of the client and the server.

33. The remotely accessible system control according to claim 31, wherein said server processor unit comprises an embedded processor.

34. The control system according to claim 31, wherein said display parameters communicated from said server to said graphic user interface software are variable by said system operator by manipulation of graphic symbols displayed on said client.

35. The control system according to claim 31, wherein said server uses an open source operating system.

* * * * *